United States Patent
Ozawa et al.

(10) Patent No.: US 10,569,546 B2
(45) Date of Patent: Feb. 25, 2020

(54) INKJET PRINTER USING OIL-BASED INK

(71) Applicant: RISO KAGAKU CORPORATION, Tokyo (JP)

(72) Inventors: Shinsuke Ozawa, Ibaraki (JP); Shinichiro Shimura, Ibaraki (JP); Marie Morinaga, Ibaraki (JP); Kazuyuki Ando, Ibaraki (JP); Hikaru Sugiura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/058,354

(22) Filed: Aug. 8, 2018

(65) Prior Publication Data

US 2019/0100002 A1  Apr. 4, 2019

(30) Foreign Application Priority Data

Sep. 29, 2017 (JP) .................. 2017-189623

(51) Int. Cl.

| | |
|---|---|
| *B41J 2/145* | (2006.01) |
| *B41J 2/21* | (2006.01) |
| *B41M 5/00* | (2006.01) |
| *C09D 11/033* | (2014.01) |
| *C09D 11/102* | (2014.01) |
| *C09D 11/36* | (2014.01) |
| *B41J 2/155* | (2006.01) |
| *B41J 2/14* | (2006.01) |

(52) U.S. Cl.
CPC ........... *B41J 2/145* (2013.01); *B41J 2/14233* (2013.01); *B41J 2/155* (2013.01); *B41M 5/0023* (2013.01); *C09D 11/033* (2013.01); *C09D 11/102* (2013.01); *C09D 11/36* (2013.01); *B41J 2002/14241* (2013.01); *B41J 2002/14419* (2013.01)

(58) Field of Classification Search
None
See application file for complete search history.

(56) References Cited

U.S. PATENT DOCUMENTS

| | | | | |
|---|---|---|---|---|
| 6,302,537 | B1 * | 10/2001 | Kato | B41C 1/1066 106/31.72 |
| 2013/0194333 | A1 * | 8/2013 | Ito | B41J 19/147 347/12 |
| 2013/0208042 | A1 * | 8/2013 | Ueshima | B41J 29/393 347/19 |
| 2017/0043580 | A1 * | 2/2017 | Takagi | B41J 2/14274 |
| 2017/0210941 | A1 * | 7/2017 | Wakabayashi | C09D 173/02 |

FOREIGN PATENT DOCUMENTS

JP  2016-132167  7/2016

* cited by examiner

*Primary Examiner* — Matthew Luu
*Assistant Examiner* — Tracey M McMillion
(74) *Attorney, Agent, or Firm* — Greenblum & Bernstein, P.L.C.

(57) ABSTRACT

An inkjet printer includes: an oil-based ink containing silicone oil; and inkjet heads each including a nozzle row in which nozzles configured to eject the oil-based ink to a print medium conveyed in a conveyance direction are arranged, the inkjet heads being arranged adjacent to each other with the nozzles in each nozzle row arranged in a direction non-orthogonally intersecting the conveyance direction.

8 Claims, 4 Drawing Sheets

INKJET PRINTER USING OIL-BASED INK

CROSS REFERENCE TO RELATED APPLICATION

This application is based upon and claims the benefit of priority from the prior Japanese Patent Application No. 2017-189623, filed on Sep. 29, 2017, the entire contents of which are incorporated herein by reference.

BACKGROUND

1. Technical Field

The disclosure relates to an inkjet printer which ejects inks from inkjet heads to a print medium to form an image.

2. Related Art

Japanese Patent Application Publication No. 2016-132167 discloses an inkjet printer which ejects inks from nozzles of inkjet heads to a print medium to form an image, the inkjet heads including nozzle rows in which multiple nozzles are arranged. In this inkjet printer, the multiple inkjet heads are arranged adjacent to one another such that the nozzles in each nozzle row are arranged in a direction non-orthogonally intersecting a conveyance direction of the print medium. Installing the inkjet heads as described above can reduce a space occupied by the inkjet heads in the inkjet printer.

SUMMARY

In the arrangement of the inkjet heads as in the aforementioned inkjet printer, since the inkjet heads are densely arranged, gaps between the inkjet heads through which cooling wind passes are small. Accordingly, cooling of the inkjet heads is difficult and the temperature of the inkjet heads tends to rise.

When the temperature of the inkjet heads rises, the temperature of each of the inks in the inkjet heads rises and the viscosity of the ink decreases. Such a change in the viscosity of the ink causes variation in an amount of the ink ejected from the nozzles of the inkjet heads and print image quality decreases in some cases. An oil-based ink containing a non-aqueous solvent as a main solvent, in particular, is more likely to cause the variation in the amount of ejected ink due to a change in the viscosity of the ink as described above than an aqueous ink containing water as a main solvent.

The disclosure is directed to an inkjet printer which can suppress a decrease in print image quality.

An inkjet printer in accordance with some embodiments includes: an oil-based ink containing silicone oil; and inkjet heads each including a nozzle row in which nozzles configured to eject the oil-based ink to a print medium conveyed in a conveyance direction are arranged, the inkjet heads being arranged adjacent to each other with the nozzles in each nozzle row arranged in a direction non-orthogonally intersecting the conveyance direction.

In the aforementioned configuration, a decrease in print image quality can be suppressed.

DETAILED DESCRIPTION

Figure 1:
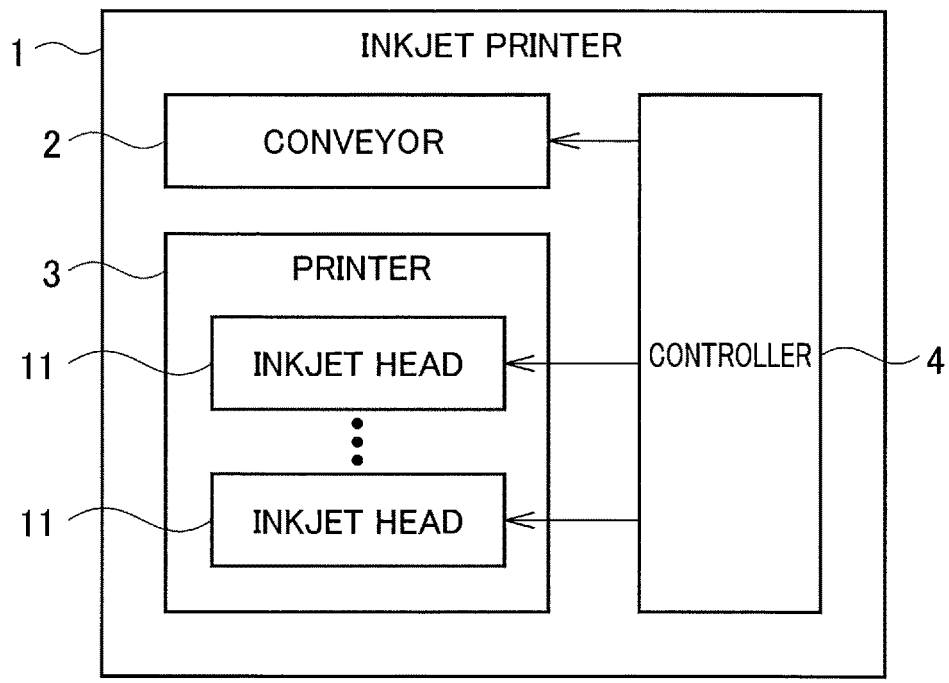
FIG. 1 is a block diagram illustrating a configuration of an inkjet printer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
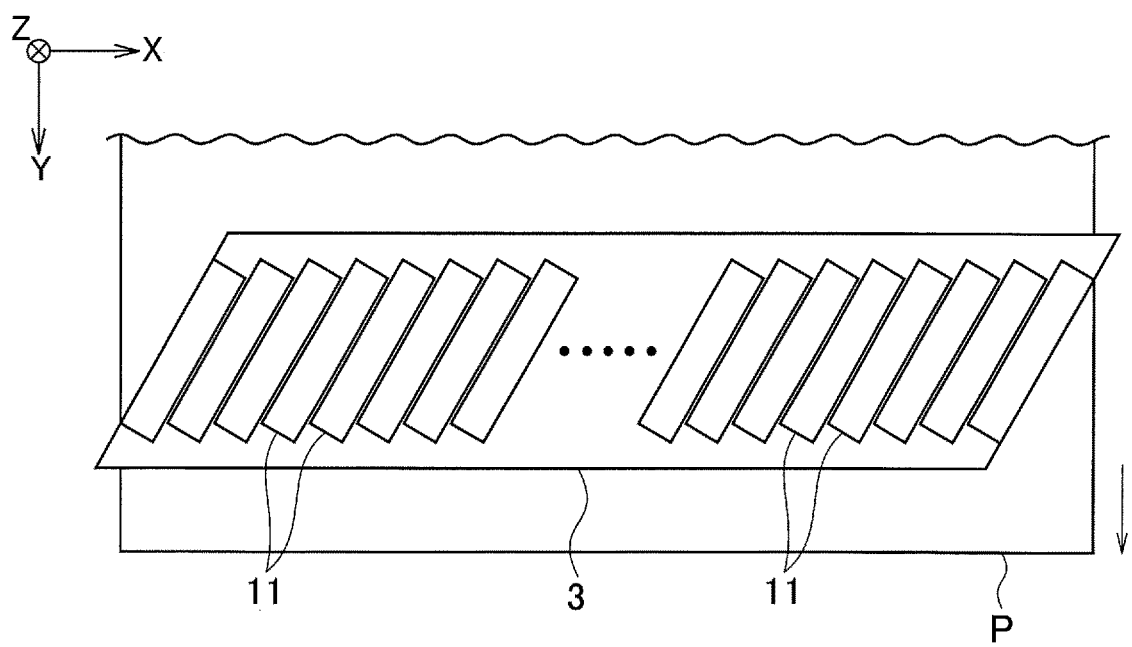
FIG. 2 is a schematic configuration diagram of a printer in the inkjet printer illustrated in FIG. 1.
Figure 3:
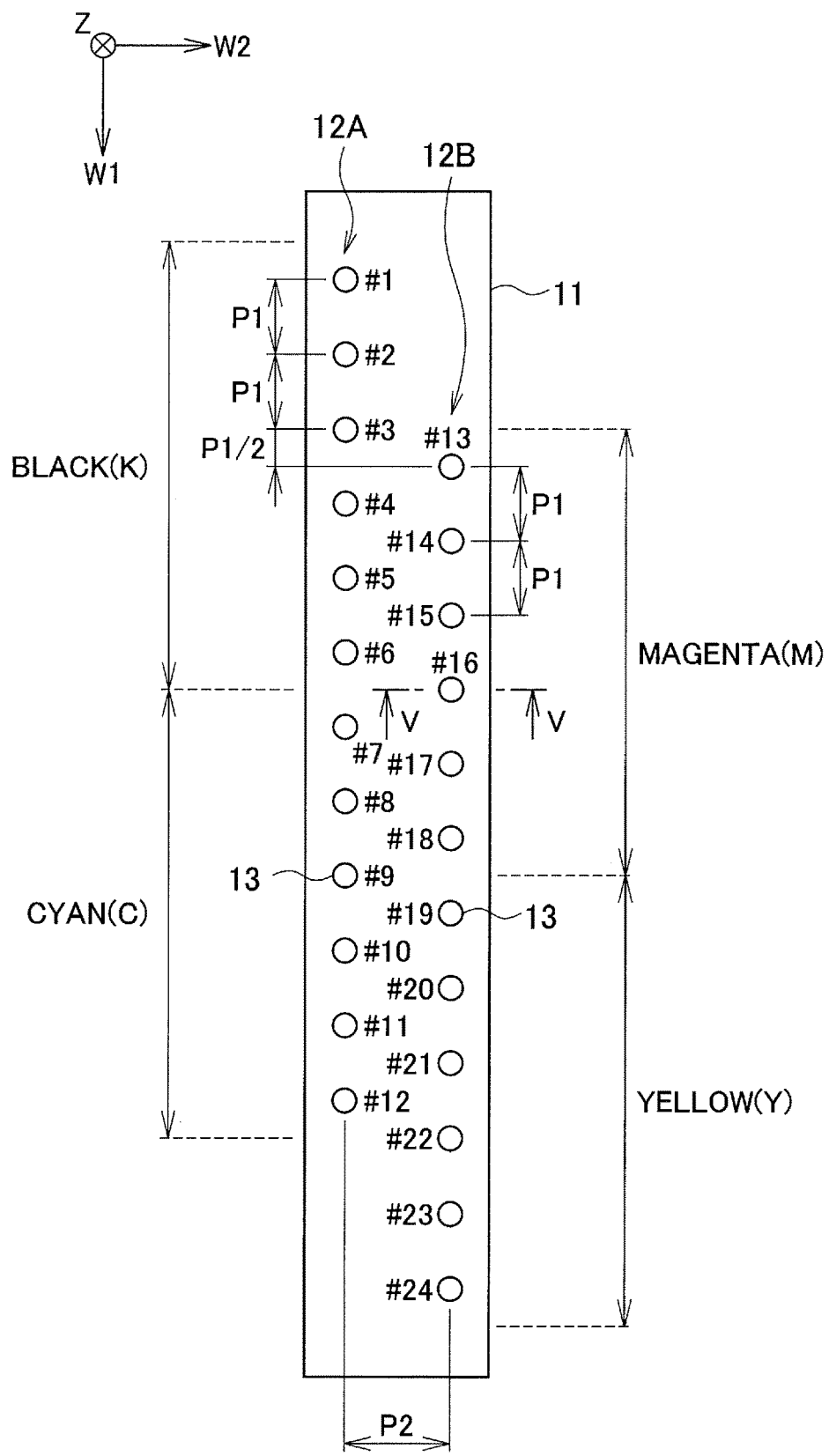
FIG. 3 is a diagram illustrating an arrangement of nozzles in an inkjet head of the printer.
Figure 4:
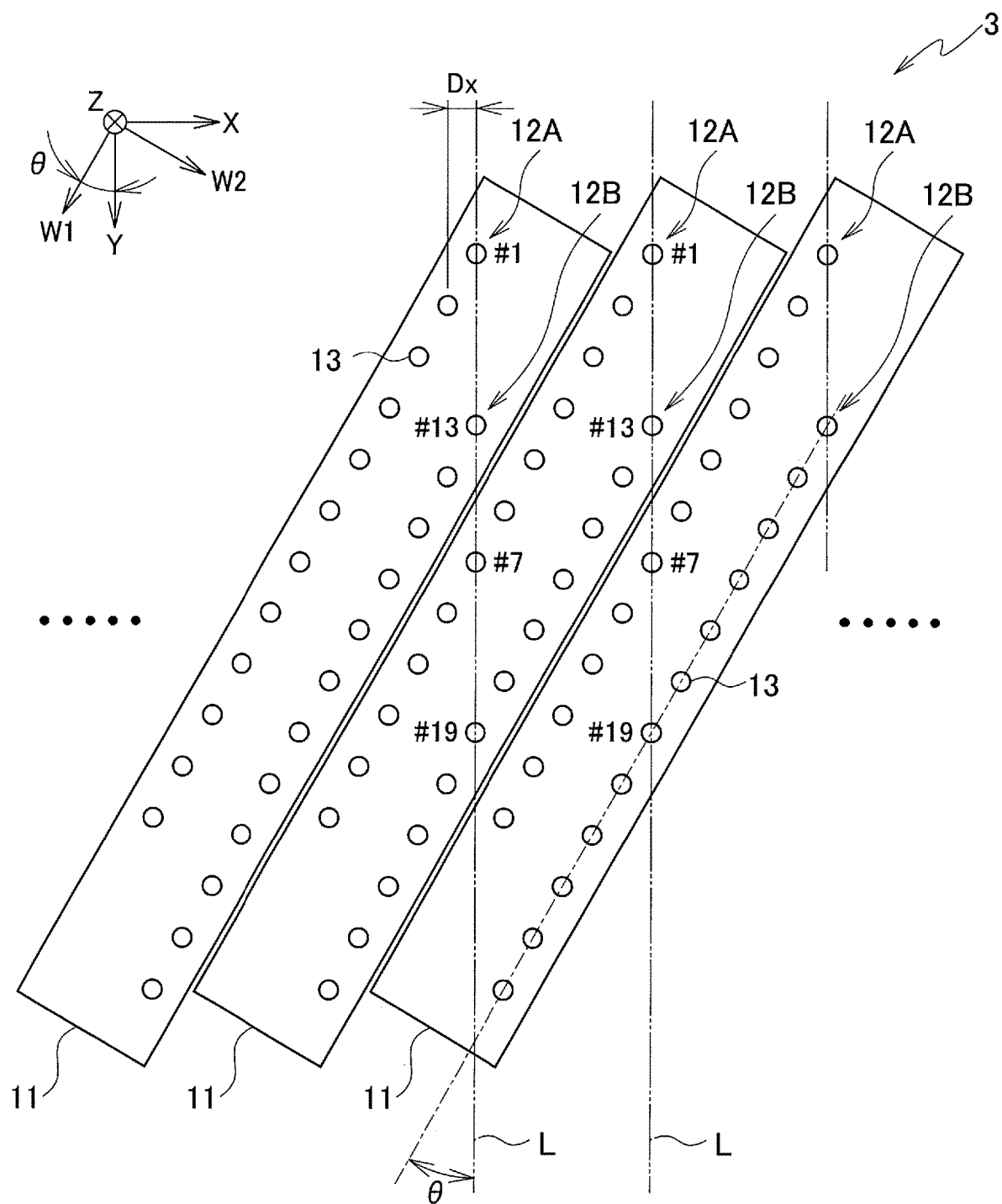
FIG. 4 is a diagram illustrating positional relationships of the nozzles in the inkjet heads of the printer.
Figure 5:
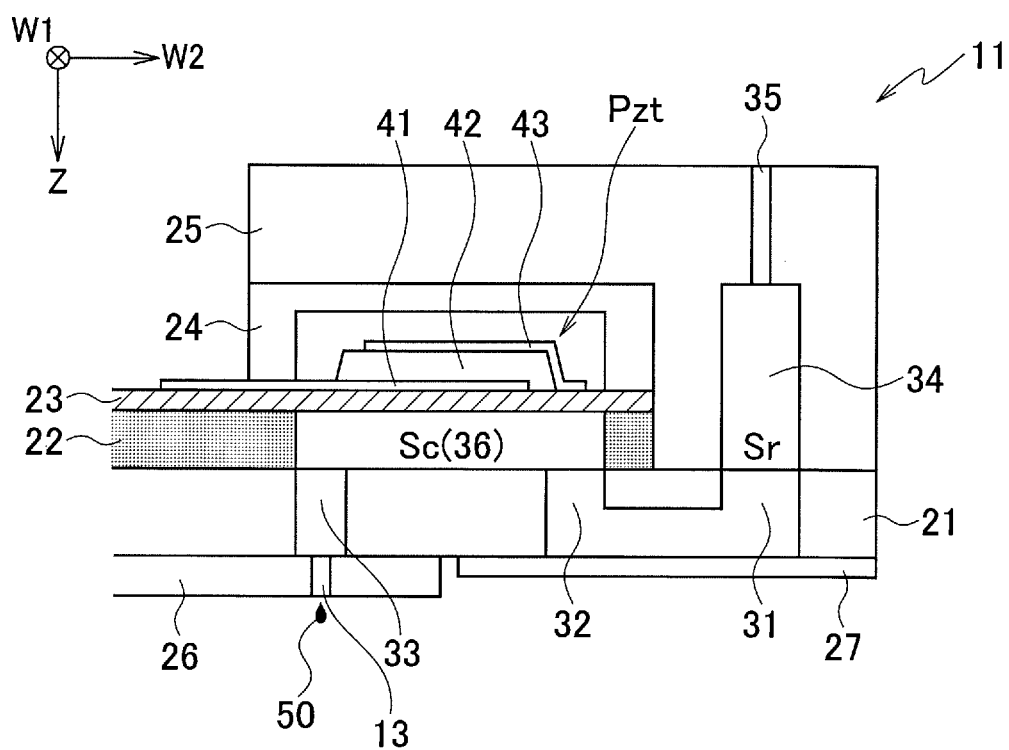
FIG. 5 is a cross-sectional view taken along the line V-V in FIG. 3.

FIG. 1 is a block diagram illustrating a configuration of an inkjet printer according to an embodiment. FIG. 2 is a schematic configuration diagram of a printer in the inkjet printer illustrated in FIG. 1. FIG. 3 is a diagram illustrating an arrangement of nozzles in an inkjet head of the printer. FIG. 4 is a diagram illustrating positional relationships of the nozzles in the inkjet heads of the printer. FIG. 5 is a cross-sectional view taken along the line V-V in FIG. 3.

Note that, in the following description, a conveyance direction of a sheet is referred to as Y direction and a width direction of the sheet orthogonal to the Y direction is referred to as X direction. Moreover, an up-down direction orthogonal to the X direction and the Y direction is referred to as Z direction.

As illustrated in FIG. 1, an inkjet printer 1 according to the embodiment includes a conveyor 2, a printer 3, and a controller 4.

The conveyor 2 conveys a sheet P which is a print medium in the Y direction.

The printer 3 forms an image on the sheet P conveyed by the conveyor 2. As illustrated in FIGS. 1 and 2, the printer 3 includes multiple inkjet heads 11.

The inkjet heads 11 form an image by ejecting, to the sheet P, inks 50, supplied to the inkjet heads 11 by a not-illustrated ink supply mechanism.

Each of the inks 50 supplied to the inkjet heads 11 and ejected therefrom is an oil-based ink 50 containing silicone oil. Specifically, the oil-based ink 50 ejected by the inkjet heads 11 is made mainly of non-aqueous solvent and colorant and contains the silicone oil as the non-aqueous solvent. For example, the silicone oil is contained within a range of 15 to 100% by mass of the non-aqueous solvent. The non-aqueous solvent may include a petroleum based hydrocarbon solvent, a fatty acid ester based solvent, a higher alcohol based solvent, and the like in addition to the silicone oil.

Moreover, pigment or dye can be used as the colorant of each of the oil-based inks 50 ejected by the inkjet heads 11 and one or both of pigment and dye can be used. Furthermore, each of the oil-based inks 50 ejected by the inkjet heads 11 may include a pigment dispersant, a preservative, an antioxidant, a surfactant, and the like.

As illustrated in FIG. 3, each of the inkjet heads 11 includes two nozzle rows 12A, 12B. Multiple nozzles 13 are formed to be arranged in a straight line in each of the nozzle rows 12A, 12B.

Note that FIG. 3 is a see-through view of the inkjet head 11 in which a viewer is looking down (in an ejection direction of the inks 50) from above the inkjet head 11 (the opposite side of the inkjet head 11 to the sheet P). This also applies to FIG. 4.

Moreover, although the number of nozzles 13 in each of the nozzle rows 12A, 12B are illustrated to be 12 in the example of FIGS. 3 and 4 to simplify the description, more nozzles 13 may be formed.

The nozzles 13 eject the inks 50 to the sheet P. The nozzles 13 are opened on a nozzle surface (surface facing the sheet P) of the inkjet head 11.

In each of the nozzle rows 12A, 12B, the multiple nozzles 13 are arranged at a predetermined pitch P1 in a W1 direction. Moreover, the nozzle rows 12A, 12B are arranged while being spaced apart at a predetermined pitch P2 in a W2 direction orthogonal to the W1 direction.

In FIG. 3, nozzle numbers for identifying the respective nozzles 13 are denoted. Specifically, in the nozzle row 12A, the nozzle numbers of No. 1 (#1), No. 2 (#2), . . . , and No. 12 (#12) are assigned to the respective nozzles 13 in series from the nozzle 13 at a negative end in the W1 direction. Moreover, in the nozzle row 12B, the nozzle numbers of No. 13 (#13), No. 14 (#14), . . . , and No. 24 (#24) are assigned to the respective nozzles 13 in series from the nozzle 13 at a negative end in the W1 direction.

The nozzle row 12A and the nozzle row 12B are arranged such that the positions thereof are shifted from each other in the W1 direction. In the example of FIG. 3, the nozzle row 12A and the nozzle row 12B are arranged to be shifted from each other in the W1 direction by a distance 2.5 times the pitch P1.

In the inkjet head 11, No. 1 to No. 6 nozzles 13 eject a black (K) ink 50. No. 7 to No. 12 nozzles 13 eject a cyan (C) ink 50. No. 13 to No. 18 nozzles 13 eject a magenta (M) ink 50. No. 19 to No. 24 nozzles 13 eject a yellow (Y) ink 50.

The inkjet heads 11 are arranged such that the W1 direction being the direction in which the nozzles 13 are arranged in the nozzle rows 12A, 12B non-orthogonally intersects the Y direction being the direction in which the sheet P is conveyed. Moreover, in the printer 3, the inkjet heads 11 are arranged adjacent to one another in the X direction.

A tilt angle θ of the inkjet heads 11 (nozzle rows 12A, 12B) relative to the Y direction is set such that the positions (coordinates) of the nozzles 13 in the nozzle row 12A in the X direction are the same as the positions (coordinates) of the nozzles 13 in the nozzle row 12B in the same inkjet head 11 in the X direction, respectively.

Specifically, as illustrated in FIG. 4, the tilt angle θ is set such that an imaginary line L parallel to the Y direction passes No. 1 nozzle 13 in the nozzle row 12A and No. 13 nozzle 13 in the nozzle row 12B. The positions of No. 1 to No. 12 nozzles 13 in the nozzle row 12A in the X direction are thereby the same as the positions of No. 13 to No. 24 nozzles 13 in the nozzle row 12B in the X direction, respectively.

The positional relationships of the inkjet heads 11 are as follows. Specifically, the inkjet heads 11 are arranged such that, in FIG. 4, the imaginary line L passing No. 1 and No. 13 nozzles 13 of the left inkjet head 11 out of two inkjet heads 11 adjacent to each other passes No. 7 and No. 19 nozzles 13 of the right inkjet head 11. The nozzles 13 ejecting the inks 50 of the respective colors are thus aligned in the Y direction and can eject the inks 50 of the respective colors to the same position in the X direction. Accordingly, color printing is possible.

An interval Dx of the nozzles 13 in the X direction is expressed by the following formula (1).

$$Dx = P1 \times \sin\theta \quad (1)$$

For example, when P1=84.7 μm and θ=60°, Dx=42.3 μm and it is possible to achieve high resolution printing of 600 dpi in the X direction.

Each inkjet head 11 ejects the inks 50 by using a piezoelectric method. Specifically, the inkjet head 11 is of a bending type out of piezoelectric types.

As illustrated in FIG. 5, the inkjet head 11 is a structural body (head chip) in which a pressure chamber substrate 22, a diaphragm 23, an encapsulation body 24, and a support body 25 are provided on a surface of a flow path substrate 21 on the negative side in the Z direction and in which a nozzle plate 26 and a compliance portion 27 are provided on a surface of the flow path substrate 21 on the positive side in the Z direction. The nozzles 13 are formed in the nozzle plate 26. The elements of the inkjet head 11 are each roughly a member with a substantially flat plate shape elongating in the W1 direction and are fixed to one another by using, for example, adhesive. Moreover, the flow path substrate 21 and the pressure chamber substrate 22 are each formed of, for example, a single crystal silicon substrate.

The flow path substrate 21 is a flat plate member forming flow paths of the inks 50. Opening portions 31, supply flow paths 32, and communication flow paths 33 are formed in the flow path substrate 21. The supply flow paths 32 and the communication flow paths 33 are formed for the respective nozzles 13 and each of the opening portions 31 is formed to be continuously provided for the multiple nozzles 13 configured to eject the ink 50 of the same color.

The support body 25 is fixed to the surface of the flow path substrate 21 on the negative side in the Z direction. Containers 34 and introduction flow paths 35 are formed in the support body 25. The containers 34 are recess portions (recesses) with an outer shape corresponding to the opening portions 31 in the flow path substrate 21 in a plan view (that is, as viewed in the Z direction). The introduction flow paths 35 are flow paths communicating with the containers 34.

Spaces obtained by causing the opening portions 31 of the flow path substrate 21 and the containers 34 of the support body 25 to communicate with one another function as liquid storage chambers (reservoirs) Sr. The liquid storage chambers Sr are formed independently for the respective colors of the inks 50 and each store the ink 50 supplied thereto through the introduction flow path 35 by the not-illustrated ink supply mechanism. Specifically, four liquid storage chambers Sr corresponding respectively to the various inks 50 are formed in each inkjet head 11.

The compliance portion 27 is an element which forms bottom surfaces of the liquid storage chambers Sr and which suppresses (absorbs) pressure fluctuation of the inks 50 in the liquid storage chambers Sr and inner flow paths. The compliance portion 27 is formed to include, for example, a flexible member formed in a sheet shape and is specifically fixed to the surface of the flow path substrate 21 such that the opening portions 31 and the supply flow paths 32 in the flow path substrate 21 are closed.

The diaphragm 23 is installed on a surface of the pressure chamber substrate 22 opposite to the flow path substrate 21.

The diaphragm 23 is a flat plate shaped member which can elastically vibrate and is formed of, for example, a laminate of an elastic film made of an elastic material such as silicon oxide and an insulating film made of an insulating material such as zirconium oxide. The diaphragm 23 and the flow path substrate 21 face each other inside the opening portions 36 of the pressure chamber substrate 22 while being arranged at an interval. Spaces between the flow path substrate 21 and the diaphragm 23 in the opening portions 36 function as pressure chambers Sc for applying pressure to the inks 50. The pressure chambers Sc communicate with the respective nozzles 13 via the communication flow paths 33 in the flow path substrate 21.

For the nozzles 13, piezoelectric elements Pzt corresponding to the respective nozzles 13 (pressure chambers Sc) are formed on a surface of the diaphragm 23 opposite to the pressure chamber substrate 22.

Each piezoelectric element Pzt includes a drive electrode 41 formed on the surface of the diaphragm 23 individually for each piezoelectric element Pzt, a piezoelectric body 42 formed on a surface of the drive electrode 41, and a drive electrode 43 formed on a surface of the piezoelectric body 42. Note that a region in which the drive electrodes 41, 43 face each other with the piezoelectric body 42 therebetween functions as the piezoelectric element Pzt.

Part of the drive electrode 41 is exposed from the encapsulation body 24 and the support body 25 to the outside. A wiring board (not illustrated) is connected to this exposed portion and voltage of a drive signal is applied thereto. Meanwhile, common constant voltage is applied to the drive electrodes 43 of multiple piezoelectric elements Pzt. Note that, since the drive electrodes 43 of the multiple piezo electric elements Pzt are electrically commonly connected, the drive electrodes 43 may be formed individually for the respective piezoelectric elements Pzt and connected to common wiring or continuously formed for the multiple piezoelectric elements Pzt.

In each piezoelectric element Pzt configured as described above, a center portion of the piezoelectric element Pzt warps upward or downward relative to its periphery in FIG. 5, together with the drive electrodes 41, 43 and the diaphragm 23, depending on the voltage applied to the drive electrodes 41, 43. Specifically, when the voltage of the drive signal applied to the piezoelectric element Pzt via the drive electrode 41 decreases, the piezoelectric element Pzt warps upward and, when the voltage increases, the piezoelectric element Pzt warps downward.

In this case, the ink 50 is maintained to form a meniscus in each nozzle 13. When the drive signal for causing the piezoelectric element Pzt to vibrate is applied via the drive electrode 41, the piezoelectric element Pzt vibrates to generate an ultrasonic vibration in the nozzle 13 and the ink 50 is ejected from the nozzle 13.

When the appropriate drive signal is applied to the piezoelectric element Pzt as described above, the vibration of the piezoelectric element Pzt causes the ink 50 drawn from the liquid storage chamber Sr to be ejected from the nozzle 13.

The controller 4 controls operations of the entire inkjet printer 1. The controller 4 includes a CPU, a RAM, a ROM, a hard disk drive, and the like.

Next, the operations of the inkjet printer 1 are described.

When printing is to be performed in the inkjet printer 1, the controller 4 controls the conveyor 2 such that the conveyor 2 picks up and conveys as many sheets P as the number of sheets to be printed one by one from a not-illustrated sheet feeding tray.

Then, the controller 4 drives the inkjet heads 11 based on image data of a print target and causes the inkjet heads 11 to form images on the conveyed sheets P.

The sheets P subjected to printing are conveyed to a not-illustrated discharge tray to be discharged. When printing and discharging are completed for the sheets to be printed, the series of printing operations is completed.

When the inkjet heads 11 are driven in the aforementioned print operations, the temperature of the inks 50 in the inkjet heads 11 rises in the pressure chambers Sc and near the nozzles 13 due to heat generated by the piezoelectric elements Pzt.

Here, assume a case where, unlike in the embodiment, each of the inks ejected by the inkjet heads 11 is an ink which contains no silicone oil. In this case, the viscosity of the ink decreases due to the temperature rise of the ink. When the viscosity of the ink changes, the amount of the ink ejected from the nozzles 13 varies and this leads to a decrease in print image quality. Particularly, an oil-based ink containing a non-aqueous solvent as a main solvent is more likely to cause variation in the amount of ejected ink due to a change in the viscosity of the ink as described above than in an aqueous ink containing water as a main solvent.

Cooling wind can be sent to the inkjet heads 11 by using a cooling fan or the like to suppress the temperature rise of the inks in the inkjet heads 11. However, in the arrangement of the inkjet heads 11 as in FIG. 2, since gaps between the inkjet heads 11 through which the cooling wind passes are small, cooling of the inkjet heads 11 is difficult and the decrease in the viscosity caused by the temperature rise of the ink is likely to occur.

Meanwhile, in the embodiment, each of the inks 50 ejected by the inkjet heads 11 are the oil-based ink 50 containing the silicone oil. The viscosity of the oil-based ink 50 containing the silicone oil is less dependent on temperature than an oil-based ink containing no silicone oil. Accordingly, the decrease in the viscosity of the ink 50 is suppressed also when the temperature of the ink 50 rises due to the drive of the inkjet heads 11. This suppresses the variation in the amount of the ink 50 ejected from the nozzles 13 and the decrease in the print image quality can be thereby suppressed.

Moreover, the oil-based inks 50 containing the silicone oil each have a lower bulk modulus than the oil-based ink containing no silicone oil. This suppresses a so-called crosstalk in which pressure states in the pressure chambers Sc change due to propagation of a pressure wave via the ink 50 in the liquid storage chamber Sr, in the piezoelectric inkjet heads 11.

The smaller the pitch P1 of the nozzles 13 is, the more likely the crosstalk is to occur. However, since the inkjet printer 1 uses the oil-based inks 50 containing the silicone oil, the crosstalk can be suppressed also when the pitch P1 is set to a small value of 100 μm or less. Accordingly it is possible to set P1 to 84.7 μm as described above and achieve high resolution printing while suppressing the decrease in the print image quality due to effects of the crosstalk.

Moreover, the oil-based inks 50 containing the silicone oil each have a lower surface tension than the oil-based inks containing no silicone oil. Accordingly, the oil-based inks 50 have excellent wettability on members forming the ink flow paths in the inkjet heads 11 and have excellent initial filling properties such as a property of suppressing air bubbles remaining on surfaces of the flow path members in the initial filling of the inks 50.

The effects of the initial filling properties are notable particularly in an inkjet head including a long ink flow path from an ink storage chamber to a pressure chamber to efficiently transmit pressure generated by a piezoelectric element to a portion near a nozzle as in the bending type inkjet head.

Note that, although description is given of the case where the inkjet heads 11 is of the bending type out of the piezoelectric types in the aforementioned embodiment, the type is not limited to the bending type and may be a xaar type or a push type.

Moreover, although description is given of the configuration in which each inkjet head 11 includes two nozzle rows 12A, 12B in the aforementioned embodiment, the number of nozzle rows included in each inkjet head is not limited to this.

The embodiment of the disclosure has, for example, the following configuration.

An inkjet printer includes: an oil-based ink containing silicone oil; and inkjet heads each including a nozzle row in which nozzles configured to eject the oil-based ink to a print medium conveyed in a conveyance direction are arranged, the inkjet heads being arranged adjacent to each other with the nozzles in each nozzle row arranged in a direction non-orthogonally intersecting the conveyance direction.

A content of the silicone oil in the oil-based ink may be in a range of 15 to 100% by mass of a non-aqueous solvent in the oil-based ink.

The oil-based ink may include at least one selected from the group consisting of a petroleum based hydrocarbon solvent, a fatty acid ester based solvent and a higher alcohol based solvent.

The inkjet heads may be piezoelectric inkjet heads.

The inkjet heads may be bending type piezoelectric inkjet heads.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer comprising:
an oil-based ink containing silicone oil; and
inkjet heads each including a nozzle row in which nozzles configured to eject the oil-based ink to a print medium conveyed in a conveyance direction are arranged, the inkjet heads being arranged adjacent to each other with the nozzles in each nozzle row arranged in a direction non-orthogonally intersecting the conveyance direction, wherein
the inkjet heads comprise first and second inkjet heads,
the first inkjet head includes a first nozzle row comprising multiple nozzles including a first nozzle, and a second nozzle row comprising multiple nozzles including a second nozzle,
the second inkjet head is adjacent to the first inkjet head and includes a third nozzle row comprising multiple nozzles including a third nozzle, and a fourth nozzle row comprising multiple nozzles including a fourth nozzle,
the first, second, third, and fourth nozzles each eject different colored ink; and
the first inkjet head and the second inkjet head are arranged such that the first nozzle in the first nozzle row, the second nozzle in the second nozzle row, the third nozzle in the third nozzle row and the fourth nozzle in the fourth nozzle row are aligned in a straight line parallel to the conveyance direction.

2. The inkjet printer according to claim 1, wherein
the nozzles of the first nozzle row are arranged in a straight line in a longitudinal direction of the first inkjet head and are spaced apart from the nozzles in the second row in a lateral direction of the first inkjet head,
the nozzles of the third nozzle row are arranged in a straight line in a longitudinal direction of the second inkjet head and are spaced apart from the nozzles in the fourth row in a lateral direction of the second inkjet head,
the nozzles of the second nozzle row are arranged in a straight line in the longitudinal direction of the first inkjet head,
the nozzles of the fourth nozzle row are arranged in a straight line in the longitudinal direction of the second inkjet head,
the first nozzle row is shifted with respect to the second nozzle row in the longitudinal direction of the first inkjet head so that the nozzles in the first row are unaligned with the nozzles in the second row in the lateral direction of the first inkjet head, and
the third nozzle row is shifted with respect to the fourth nozzle row in the longitudinal direction of the second inkjet head so that the nozzles in the third row are unaligned with the nozzles in the fourth row in the lateral direction of the second inkjet head.

3. The inkjet printer according to claim 2, wherein
the distance between each pair of adjacent nozzles in each nozzle row in the longitudinal direction is denoted by P1,
the distance between the first and second nozzle rows in the lateral direction is denoted as P2, and
P2 is 2.5 times P1.

4. The inkjet printer according to claim 1, wherein
the distance between adjacent nozzles in the first nozzle row in a longitudinal direction of the first inkjet head is 100 μm or less, and
the distance between adjacent nozzles in the second nozzle row in the longitudinal direction of the first inkjet head is 100 μm or less.

5. An inkjet printer comprising:
an oil-based ink containing silicone oil; and
inkjet heads each including a nozzle row in which nozzles configured to eject the oil-based ink to a print medium conveyed in a conveyance direction are arranged, the inkjet heads being arranged adjacent to each other with the nozzles in each nozzle row arranged in a direction non-orthogonally intersecting the conveyance direction, wherein
the inkjet heads comprise first and second inkjet heads,
the first inkjet head includes a first nozzle row comprising multiple nozzles including a first nozzle, and a second nozzle row comprising multiple nozzles including a second nozzle,
the second inkjet head is adjacent to the first inkjet head and includes a third nozzle row comprising multiple nozzles including a third nozzle, and a fourth nozzle row comprising multiple nozzles including a fourth nozzle, the first inkjet head and the second inkjet head are arranged such that the first nozzle in the first nozzle row, the second nozzle in the second nozzle row, the third nozzle in the third nozzle row and the fourth nozzle in the fourth nozzle row are aligned in a straight line parallel to the conveyance direction;

each nozzle row includes twelve nozzles, a first set of six nozzles of the first nozzle row, each of which is adjacent to at least one other nozzle in the first set, ejects black ink, and second set of six nozzles of the first nozzle row, each of which is adjacent to at least one other nozzle in the second set, ejects cyan ink, and a third set of six nozzles of the second nozzle row, each of which is adjacent to at least one other nozzle in the third set, ejects magenta ink, and a fourth set of six nozzles of the second nozzle row, each of which is adjacent to at least one other nozzle in the fourth set, ejects yellow ink.

6. The inkjet printer according to claim 5, wherein the nozzles of the first nozzle row are arranged in a straight line in a longitudinal direction of the first inkjet head and are spaced apart from the nozzles in the second row in a lateral direction of the first inkjet head, the nozzles of the third nozzle row are arranged in a straight line in a longitudinal direction of the second inkjet head and are spaced apart from the nozzles in the fourth row in a lateral direction of the second inkjet head, the nozzles of the second nozzle row are arranged in a straight line in the longitudinal direction of the first inkjet head, the nozzles of the fourth nozzle row are arranged in a straight line in the longitudinal direction of the second inkjet head, the first nozzle row is shifted with respect to the second nozzle row in the longitudinal direction of the first inkjet head so that the nozzles in the first row are unaligned with the nozzles in the second row in the lateral direction of the first inkjet head, and the third nozzle row is shifted with respect to the fourth nozzle row in the longitudinal direction of the second inkjet head so that the nozzles in the third row are unaligned with the nozzles in the fourth row in the lateral direction of the second inkjet head.

7. The inkjet printer according to claim 5, wherein the distance between each pair of adjacent nozzles in each nozzle row in the longitudinal direction is denoted by P1, the distance between the first and second nozzle rows in the lateral direction is denoted as P2, and P2 is 2.5 times P1.

8. The inkjet printer according to claim 5, wherein the distance between adjacent nozzles in the first nozzle row in a longitudinal direction of the first inkjet head is 100 µm or less, and the distance between adjacent nozzles in the second nozzle row in the longitudinal direction of the first inkjet head is 100 µm or less.

* * * * *